UNITED STATES PATENT OFFICE.

FREDERICK BENNETT, OF BAGILLT, ENGLAND.

IMPROVEMENT IN THE MANUFACTURE OF ZINC.

Specification forming part of Letters Patent No. 37,803, dated March 3, 1863.

*To all whom it may concern:*

Be it known that I, FREDERICK BENNETT, of Bagillt, in the county of Flint, England, have invented or discovered a certain new and useful Improvement in the Manufacture of Spelter; and I do hereby declare that the following is a full, clear, and exact description thereof.

In the process of reducing zinc ores—

First. The blende, calamine, or other ore is calcined and thus rendered friable, a portion of water and carbonic acid being expelled. It is then to be reduced to powder in any suitable manner.

Secondly. The powder is to be mixed with a due proportion of charcoal or other carbonaceous matter, and when heated in closed earthen retorts the metallic zinc is obtained by condensation of the vapor which comes over, the action being that of dry distillation.

My improvement has reference only to this latter part of the process; and it consists in mixing with the calcined ore and with the carbonaceous matter in the closed retort a proportion of a chloride or a compound containing chlorine, whereby the volatilization is accelerated and the product increased.

I carry this into effect in the following manner: To the ordinary mixture of calcined ore and carbonaceous matter I add a chlorine compound, preferring it in the form of chloride of sodium, and the proportion of this salt may be about ten per cent., although this may be varied according to the quality and character of the ore. When this mixture is exposed to heat in the usual retorts the chlorine is set free, and acts as a powerful supporter of combustion, thereby quickening the volatilization and increasing the proportion of metallic zinc which passes over, and which is condensed and collected by the usual processes.

I am aware that chlorine has been heretofore employed in the manufacture of spelter, but not at the stage of the proceedings nor in the manner nor for the purpose for which I avail myself of its properties. For instance, a stream or shower of muriatic acid has been passed into the flues of the retort-furnace for the purpose of dissolving any oxide or fumes of zinc which might have escaped from some faulty retort, and collecting this (which would otherwise have been lost) in a suitable reservoir in the form of a soluble salt of zinc, as the chloride of zinc. So, also, chloride of sodium has been mixed with the zinc ores in the process of calcination, the chemical effect being the same as in the former instance—that is, the obtaining of a soluble salt of zinc, which is either caught in a flue or condensing-chamber, as evolved, and then dissolved, or it is dissolved out from the ore after calcination is complete, the zinc being obtained from the solution as an oxide by precipitation. This oxide is then to be converted into metallic zinc by smelting in the usual retorts; but it will be obvious that when charged into those retorts it has no trace of chlorine remaining.

I claim—

The use or employment of a chloride or compound of chlorine in the manufacture of zinc by mixing it with the calcined ore and with the carbonaceous matter in the smelting-retorts, substantially in the manner set forth.

FREDERICK BENNETT.

Witnesses:
ALFRED COURAGE,
ALEXANDER WATT.